No. 745,849. PATENTED DEC. 1, 1903.
W. W. HOPKINS.
CAR BRAKE.
APPLICATION FILED DEC. 29, 1902.
NO MODEL. 2 SHEETS—SHEET 2.
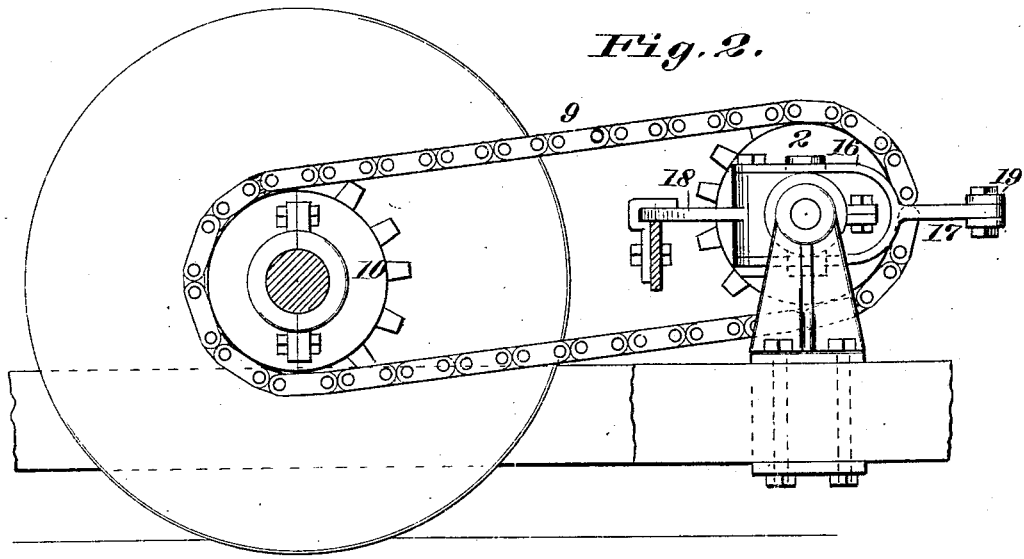
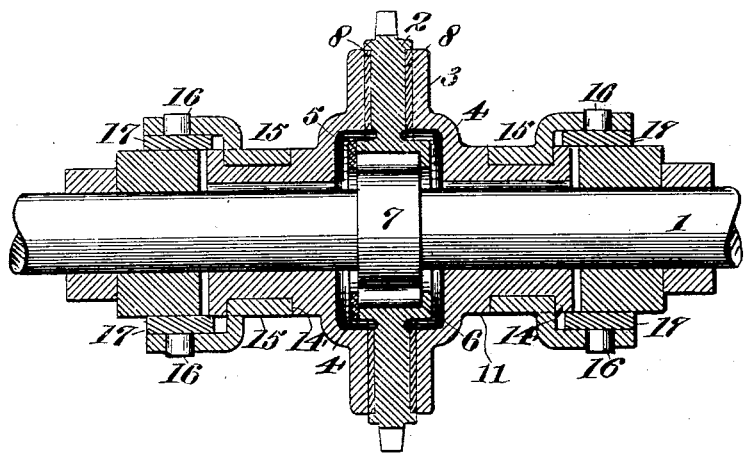
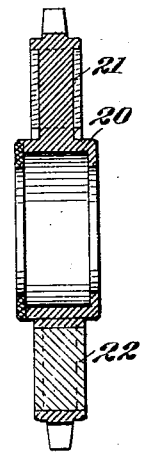
Attest:
Charles Pickles
Edw. L. Dillon
Inventor:
William W. Hopkins
By J. D. Rippey
Atty No. 745,849. Patented December 1, 1903.

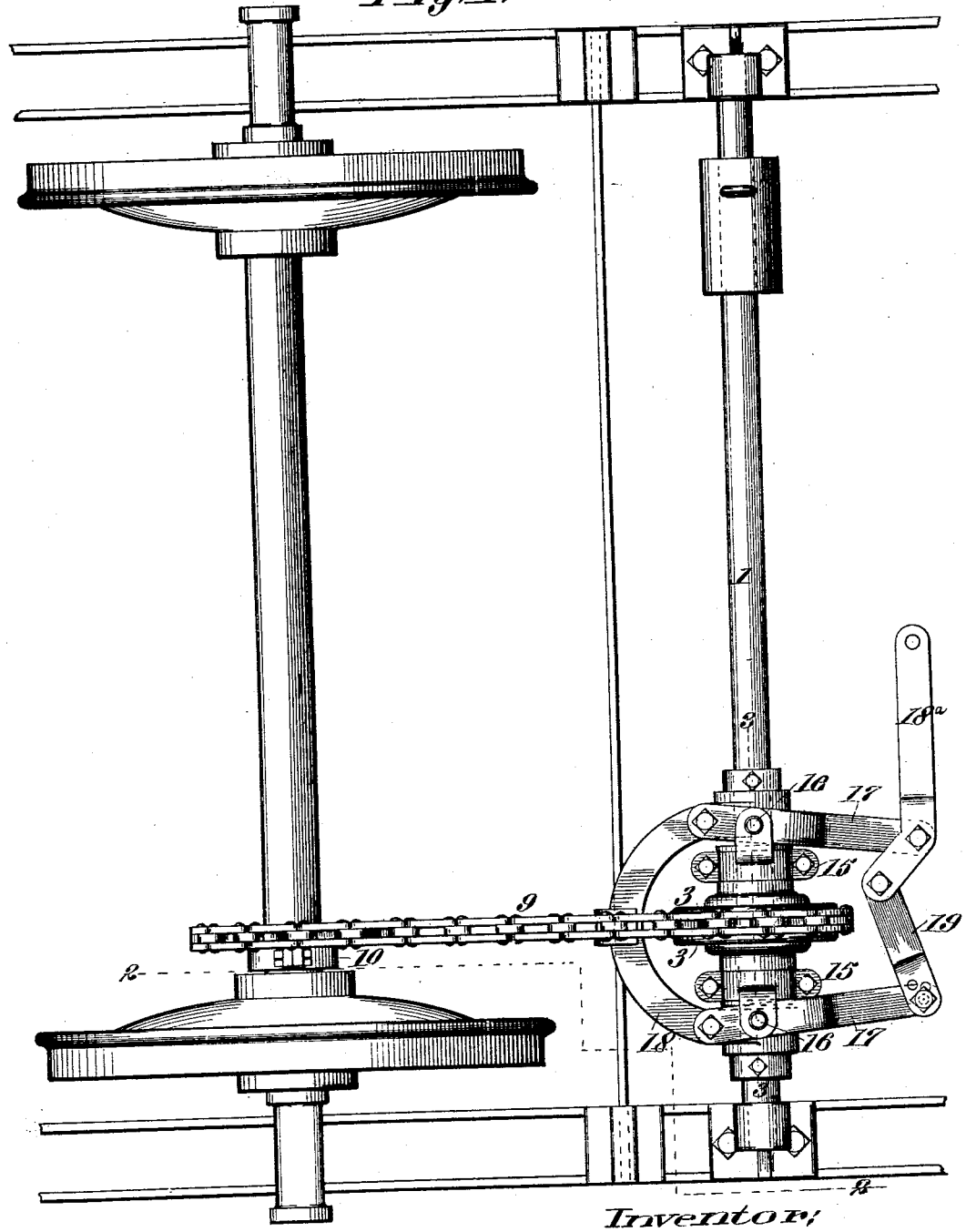

UNITED STATES PATENT OFFICE.

WILLIAM W. HOPKINS, OF ST. LOUIS, MISSOURI, ASSIGNOR TO HOPKINS BRAKE COMPANY, A CORPORATION OF MISSOURI.

CAR-BRAKE.

SPECIFICATION forming part of Letters Patent No. 745,849, dated December 1, 1903.

Application filed December 29, 1902. Serial No. 136,971. (No model.)

*To all whom it may concern:*

Be it known that I, WILLIAM W. HOPKINS, a citizen of the United States, residing at St. Louis, Missouri, have invented a new and useful Improvement in Car-Brakes, of which the following is a specification.

This invention relates to car-brakes; and it consists of the novel construction, combination, and arrangement of parts hereinafter shown, described, and claimed.

The object of my invention is to produce an improved power-brake of the class known as "friction-brakes," comprising a clutch one member of which is constantly moving when the car travels and the other members of which clutch may be engaged with the movable member at will, and connections whereby the brakes will be applied at once whenever the clutch members are so operated.

A further object is to improve the form of brake shown and described in a prior application, filed by me July 28, 1901, Serial No. 108,985.

Figure 1 is a plan view of a part of a car-truck, showing my invention as mounted. Fig. 2 is a view, partly in section, along line 2 2 of Fig. 1. Fig. 3 is a sectional view of the clutch on line 3 3 of Fig. 1. Fig. 4 is a sectional view showing a modified form of the central member of the friction-clutch.

Shaft 1 is supported transversely in the truck-frame parallel with the axle, rotatable, but normally stationary. Mounted thereon, preferably near one end, as shown, is a clutch, comprising a central rotary member 2, in the form of a sprocket-wheel, and two laterally-movable members 3, one on either side of the wheel 2. The hub of the wheel 2 is provided with a flange 4 on one side, and a corresponding ring or disk 5 is attached to its opposite side, said flange and ring forming retainers whereby the rollers 6 are held in place, the latter being the roller-bearing for the wheel 2. A collar or enlargement 7 may be fixed upon the shaft 1 as a bearing for the rollers 6, or the latter may rotate directly upon the said shaft 1. To each side of the wheel 2 I secure a section 8, of some suitable fibrous material, such as leather or wood, forming bearing-surfaces for the disks or members 3.

The sprocket-wheel 2 supports the endless chain 9, which also passes around the wheel 10, which is fixed upon the car-axle and rotates therewith. This results in the constant rotation of the wheel 2 when the car is traveling, said wheel turning freely upon the shaft 1 until engaged by the side members of the clutch, as I will now describe.

Each member or disk 3 is formed with an integral hub 11, and in each hub is a groove 14. Within said grooves 14 rings 15 are placed, free to turn relative to the hubs. Each ring 15 is composed of two parts having radial projections bolted or otherwise fastened together, as shown in Fig. 1. Said rings 15 are provided with integral outward projections 16 above and below the shaft 1, and the bifurcated levers 17 are pivoted to said projections. (See Fig. 3.) The rear ends of the levers 17 are connected by a link 18, which forms the fulcrum for the levers, so that when the forward ends of the levers are moved inward the members 3 of the clutch will be forced against the wheel members 2, which results in the rotation of the shaft 1. From said shaft 1 a connection (not shown) leads to the brake-lever, so that the rotation of the shaft winds up the connection, and hence applies the brakes very soon after the operation of the clutch.

For operating the levers 17 the lever 18ª is pivoted to the front end of one of them, and a link 19 connects the inner end of said lever 18ª to the other one of the levers 17. The result of drawing the free end of the lever 18ª forward will be the operation of the friction-clutch and the application of the brakes, as above described. For so operating the lever 18ª a connection leads therefrom to the brake-spindle; but these parts being of well-known construction are not herein shown.

In Fig. 4 I show a modified form of the wheel 2. This form consists of the wheel 20, having a number of spokes 21, between which are located blocks 22, of wood or other suitable material, which project beyond the spokes 21 and form the friction-surfaces for the members 3, taking the place of the leather sections 8.

I claim—

1. A friction-clutch consisting of a central rotary member, a non-rotary member at each side thereof, a lever adjacent to and projecting beyond each of the non-rotary members, a fulcrum member connecting said levers, and a single lever for conveying the opposite ends of said levers with equal force and thereby operating the friction members, substantially as specified.

2. Improved friction-clutch for brake-operating devices, consisting of a central rotary member, two non-rotary side members, a lever alongside of each side member, an operating-lever carried by one of said levers and means for applying both members of the clutch when the operating-lever is moved, substantially as specified.

3. A brake-operating device consisting of a central member, a friction-disk at each side thereof, levers bearing against the sides of the friction-disks, a fulcrum member connecting the ends of said levers, a single lever for converging the opposite ends of said levers with equal force thereby closing the clutch, and means connected therewith for applying the brakes, substantially as specified.

4. The improved friction-clutch for brake-operating purposes consisting of a wheel, a disk on each side and capable of movement into contact therewith jointly, a lever at each side of the clutch, a common fulcrum member connecting the ends of said levers, a single lever for converging the opposite ends of said levers thereby causing the clutch to rotate, and means for applying the brakes when such operation occurs, substantially as specified.

5. In a clutch for brake-operating purposes, the combination of a central member, a movable member at each side thereof, two levers having their ends connected by a common fulcrum, mounted adjacent to said side members, and a single operating-lever for converging the free ends of said levers to set the clutch, substantially as specified.

In testimony whereof I have signed my name to this specification in the presence of two witnesses.

WILLIAM W. HOPKINS.

Witnesses:
EDW. L. DILLON,
ROSE KURTZEBORN.